US012350239B2

(12) United States Patent
Rawlinson

(10) Patent No.: US 12,350,239 B2
(45) Date of Patent: Jul. 8, 2025

(54) TACTILE SENSORY DEVICE FOR USE BY A BABY OR CHILD

(71) Applicant: Jasmine Rawlinson, Marehay (GB)

(72) Inventor: Jasmine Rawlinson, Marehay (GB)

( * ) Notice: Subject to any disclaimer, the term of this patent is extended or adjusted under 35 U.S.C. 154(b) by 488 days.

(21) Appl. No.: 17/635,335

(22) PCT Filed: Aug. 12, 2020

(86) PCT No.: PCT/GB2020/051918
§ 371 (c)(1),
(2) Date: Feb. 14, 2022

(87) PCT Pub. No.: WO2021/032950
PCT Pub. Date: Feb. 25, 2021

(65) Prior Publication Data
US 2022/0313560 A1 Oct. 6, 2022

(30) Foreign Application Priority Data
Aug. 16, 2019 (GB) ..................................... 1911782

(51) Int. Cl.
*A61J 17/00* (2006.01)
*A61J 17/02* (2006.01)

(52) U.S. Cl.
CPC ............. *A61J 17/001* (2015.05); *A61J 17/02* (2013.01); *A61J 17/101* (2020.05); *A61J 17/111* (2020.05); *A61H 2201/0153* (2013.01); *A61H 2201/5097* (2013.01)

(58) Field of Classification Search
CPC ...... A61J 17/001; A61J 17/101; A61J 17/111; A61J 17/02; A61H 2201/0153; A61H 2201/5097
See application file for complete search history.

(56) References Cited

U.S. PATENT DOCUMENTS

| | | | | |
|---|---|---|---|---|
| 3,563,229 | A | 2/1971 | Petrusson | |
| 4,718,876 | A * | 1/1988 | Lee | A63H 3/001 601/78 |
| 5,063,912 | A | 11/1991 | Hughes | |
| 5,352,187 | A | 10/1994 | Tseng | |
| 5,520,616 | A | 5/1996 | Hofmeister | |

(Continued)

FOREIGN PATENT DOCUMENTS

| | | | |
|---|---|---|---|
| CA | 2182229 | A1 | 1/1998 |
| CN | 201642792 | U | 11/2010 |

(Continued)

OTHER PUBLICATIONS

Hecher et al., Circulation, vol. 91, Issue 1, Jan. 1, 1995, pp. 129-138. (Year: 1995).*

(Continued)

*Primary Examiner* — Ryan J. Severson
*Assistant Examiner* — Cherie M Poland
(74) *Attorney, Agent, or Firm* — Fitch, Even, Tabin & Flannery LLP

(57) ABSTRACT

There is provided a tactile sensory device for use by a baby or child. The tactile sensory device comprises a pulsation actuator configured to, in use, produce a mechanical vibration having a pulsatile waveform that is the same, or substantially the same, as a pulsatile waveform of blood flowing in an umbilical cord.

19 Claims, 5 Drawing Sheets

(56) References Cited

U.S. PATENT DOCUMENTS

| | | | |
|---|---|---|---|
| 5,551,952 A | 9/1996 | Falgout | |
| 5,649,964 A | 7/1997 | Berman | |
| 5,660,597 A | 8/1997 | Fox | |
| 5,683,421 A | 11/1997 | Guarini, Jr. | |
| 5,693,073 A | 12/1997 | Glick | |
| 5,865,771 A | 2/1999 | Shuto | |
| 5,902,322 A | 5/1999 | Scagliotti | |
| 6,142,963 A | 11/2000 | Black | |
| 6,193,742 B1 | 2/2001 | Moriarty | |
| 6,264,678 B1 | 7/2001 | Landers | |
| 9,877,522 B1 | 1/2018 | Martinson | |
| 10,201,236 B1 | 2/2019 | Cloud | |
| 2001/0047189 A1 | 11/2001 | Griffith | |
| 2002/0117115 A1 | 8/2002 | Helwig | |
| 2004/0093033 A1 | 5/2004 | Desousa | |
| 2005/0119699 A1 | 6/2005 | Sari | |
| 2005/0251211 A1 | 11/2005 | Knifong | |
| 2006/0253154 A1 | 11/2006 | Equils | |
| 2007/0074348 A1 | 4/2007 | Carlton | |
| 2010/0075285 A1 | 3/2010 | Stalling | |
| 2011/0036801 A1* | 2/2011 | Krans | A61B 5/02416 215/11.1 |
| 2012/0078143 A1* | 3/2012 | Hernandez | A61H 21/00 606/236 |
| 2013/0041435 A1 | 2/2013 | Macsovits | |
| 2013/0138022 A1 | 5/2013 | Digiacomo | |
| 2013/0225913 A1 | 8/2013 | Dunn | |
| 2014/0194791 A1 | 7/2014 | Tai | |
| 2017/0304155 A1 | 10/2017 | Leung | |
| 2018/0207065 A1* | 7/2018 | Tepper | A61J 17/1012 |

FOREIGN PATENT DOCUMENTS

| | | | |
|---|---|---|---|
| CN | 203591110 | | 5/2014 |
| CN | 104470405 | | 3/2015 |
| CN | 204390719 | | 6/2015 |
| CN | 105456014 | A | 4/2016 |
| CN | 105686473 | A | 6/2016 |
| CN | 107693918 | | 2/2018 |
| DE | 4406579 | A1 | 9/1995 |
| DE | 202008000122 | U1 | 4/2008 |
| DE | 202008004671 | U1 | 8/2008 |
| EP | 1269963 | A1 | 1/2003 |
| EP | 1491174 | A1 | 12/2004 |
| EP | 2485701 | A1 | 8/2012 |
| EP | 2673062 | A1 | 12/2013 |
| EP | 2716275 | A1 | 4/2014 |
| EP | 3150186 | A1 | 4/2017 |
| GB | 2285751 | A | 7/1995 |
| GB | 2418862 | A | 4/2006 |
| GB | 2477716 | A | 8/2011 |
| JP | 2007159795 | | 6/2007 |
| JP | 2012108528 | | 6/2012 |
| JP | 6453011 | | 1/2019 |
| KR | 20070037838 | | 4/2007 |
| TW | M505267 | U | 7/2015 |
| WO | 200447583 | A2 | 6/2004 |
| WO | 2009133492 | | 11/2009 |
| WO | 2009152727 | A1 | 12/2009 |
| WO | 2013059625 | | 4/2013 |
| WO | 201608015 | A1 | 1/2016 |
| WO | 2016058186 | | 4/2016 |
| WO | 2016127414 | A1 | 8/2016 |

OTHER PUBLICATIONS

Patent Cooperation Treaty, International Search Report and Written Opinion of the International Searching Authority issued in International Application No. PCT/GB2020051918, Jan. 27, 2021, 8 pp.

China National Intellectual Property Administration, First Office Action issued in International Application No. 202080062300.6, Oct. 19, 2023, 18 pp.

European Patent Office, Communication pursuant to Article 94(3) EPC received in Application No. 20 793 041.3, Nov. 8, 2024, 7 pp.

Kurjak, Asim et al., Behavioral pattern continuity from prenatal to postnatal life—a study by four-dimensional (4D) ultrasonography, J. Perinat. Med. 32, pp. 346-353, (2004), 8 pp.

Valman, H.B., et al., What the Fetus Feels, British Medical Journal, Jan. 26, 1980, pp. 233-234, 2 pp.

* cited by examiner

TACTILE SENSORY DEVICE FOR USE BY A BABY OR CHILD

CROSS-REFERENCE TO RELATED APPLICATIONS

This application is a U.S. national phase application filed under 35 U.S.C. § 371 of International Application No. PCT/GB2020/051918, filed Aug. 12, 2020, designating the United States, which claims priority from United Kingdom patent application No. 1911782.9, filed Aug. 16, 2019, which are hereby incorporated by reference herein in their entirety.

This invention relates to a tactile sensory device for use by a baby or child.

It is known to use sensory devices and toys to stimulate or comfort a baby or child.

According to a first aspect of the invention, there is provided a tactile sensory device for use by a baby or child, the tactile sensory device comprising a pulsation actuator configured to, in use, produce a mechanical vibration having a pulsatile waveform that is the same, or substantially the same as, a pulsatile waveform of blood flowing in an umbilical cord.

An umbilical cord connects a human fetus to a placenta inside the mother's womb. The purpose of the umbilical cord is to carry oxygenated blood and nutrients from the placenta to the fetus via the umbilical vein and to carry deoxygenated blood and waste products from the fetus to the placenta via the umbilical artery. The blood flows in a pulsating manner through the umbilical cord. Shortly after birth, the umbilical cord is detached from the new-born baby via a clamping and cutting procedure.

The inventor has found from a study of sonogram images, including 4d live scanning images and 2d sonogram images, that fetuses inside the mother's womb have the tendency to hold or grip the umbilical cord, bring it to their lips and/or suck on part of the umbilical cord in order to comfort themselves inside the womb.

Through its configuration to produce a mechanical vibration having a pulsatile waveform that is the same, or substantially the same as, a pulsatile waveform of blood flowing in an umbilical cord, the tactile sensory device of the invention is capable of mimicking the pulsation of blood flowing in the umbilical cord and thereby recreating a familiar sensation for a baby or child, especially for new-born babies entering a new and unfamiliar environment shortly after birth. This in turn provides a way of providing comfort, producing a soothing effect and relieving stress for the baby or child. In particular, the tactile sensory device of the invention may be used to provide comfort for premature babies, particularly when they are being cared for in a hospital ward.

The tactile sensory device of the invention is preferably for use by new-born babies but may also be used by a toddler, infant or older child. For the purposes for this specification, the term "baby" is intended to cover new-born babies, infants and toddlers. Preferably the term "child" covers children in the age range of 3 to 7 years but may cover children of other ages.

Preferably the pulsatile waveform of the mechanical vibration is the same, or substantially the same as, a pulsatile waveform of blood flowing in an umbilical cord in a healthy state.

In a preferred embodiment of the invention, the pulsatile waveform of blood flowing in an umbilical cord is a sawtooth, or substantially sawtooth, waveform.

The pulsatile waveform of blood flowing in an umbilical cord may be measured and recorded using Doppler ultrasonography. More specifically, the pulsatile waveform of blood flowing in an umbilical cord can be measured using spectral Doppler velocimetry. The pulsatile waveform of blood flowing in an umbilical cord has a waveform shape that corresponds to the variation of umbilical cord blood flow velocity with time.

The pulsation actuator may be configured to produce a pulsatile waveform that follows a generic pulsatile waveform of blood flowing in an umbilical cord.

Alternatively the pulsation actuator may be configured to produce a pulsatile waveform that follows a pulsatile waveform of blood flowing in the baby's umbilical cord that is measured and recorded while the baby is inside their mother's womb. The pulsatile waveform of blood flowing in the baby's umbilical cord may be measured and recorded at different gestational ages because the pattern of blood flow through the umbilical cord changes depending on the age of the pregnancy.

Optionally the tactile sensory device may include a controller configured to, in use, generate an electrical signal to control the pulsation actuator to produce the mechanical vibration. In such embodiments, the controller may include a waveform generator configured to, in use, provide an electrical waveform signal to drive the pulsation actuator to produce the mechanical vibration. The controller may be configured to include one or more electronic components, such as a processor, a microcontroller or other electronic circuitry, to generate the electrical signal.

In this way the pulsation actuator is configured as a transducer to convert the electrical signal into the mechanical vibration. The provision of the controller in the tactile sensory device of the invention allows the pulsatile waveform of the mechanical vibration to be controlled to more reliably and accurately follow the pulsatile waveform of blood flowing in an umbilical cord.

In embodiments of the invention, the controller may be a programmable controller. For example, the controller may be connected to an input device for inputting programming instructions. Furthermore, the controller may be integral with the input device, or the controller and input device may both form part of the tactile sensory device, or the controller may be connected to an external input device via a wired connector or a wireless connection such as Bluetooth® or near field communication (NFC). The wired connector may be permanently connected to the controller or may be detachably connected to the connector via a plug and socket connection.

Configuring the controller as a programmable controller allows the tactile sensory device to produce a range of mechanical vibrations through reprogramming of the controller. This may be particularly useful when used in combination with a selection of pulsatile waveforms of blood flowing in an umbilical cord, e.g. multiple pulsatile waveforms corresponding to different gestational ages. Furthermore, the actual pulsatile waveform of blood flowing in an umbilical cord may be measured on a regular basis throughout the pregnancy so that the controller can be programmed to control the pulsation actuator to produce the mechanical vibration with the pulsatile waveform that would be the most familiar to the new-born baby shortly after birth.

In addition, the controller may be programmed to control the timing and duration of the mechanical vibration. For example, the controller may be programmed to control the pulsation actuator to stop the mechanical vibration after a specific time period has lapsed, or to periodically produce the mechanical vibration at regular intervals of time.

Alternatively, in other embodiments of the invention, the controller may be a hardwired controller. For example, the controller may include a digital circuit comprising a plurality of combinational logic units to generate the electrical signal.

Configuring the controller as a hardwired controller results in a simpler construction of the tactile sensory device that is configured to produce a specific mechanical vibration.

It will be understood that, in other embodiments of the invention, the tactile sensory device may be configured to work with an external controller. That is to say, the external controller does not form part of the tactile sensory device. The features of the controller of the tactile sensory device according to the invention apply mutatis mutandis to the features of the external controller.

The pulsation actuator may include a motor for producing the mechanical vibration. Such a motor may be in the form of, but is not limited to, a haptic motor. The provision of a motor in the pulsation actuator provides a reliable and compact means for producing the mechanical vibration.

In further embodiments of the invention, the tactile sensory device may include a housing mechanically coupled to the pulsation actuator, wherein the pulsation actuator is contained inside the housing or is integral to the housing. Mechanically coupling the housing to the pulsation actuator means that the mechanical vibration produced by the pulsation actuator causes the housing to also produce a mechanical vibration having a pulsatile waveform that is the same, or substantially the same as, a pulsatile waveform of blood flowing in an umbilical cord. The provision of the housing in the tactile sensory device of the invention not only protects the pulsation actuator from damage but also prevents the baby or child from freely accessing the pulsation actuator that could lead to harm to the baby or child, such as accidentally swallowing small components of the pulsation actuator.

In embodiments of the invention, an outward-facing surface of the housing may be shaped to be the same, or substantially the same, as an outward-facing surface of an umbilical cord. For example, the housing may be shaped or substantially shaped as a tube, and/or may include a series of grooves that are spaced apart along a length of the housing or about a circumference of the housing. Preferably each groove is inclined relative to the axis of the housing.

In further embodiments of the invention, an outward-facing surface of the housing may be textured to be the same, or substantially the same, as an outward-facing surface of an umbilical cord. For example, the outward-facing surface of the housing may be configured to have a gelatinous or spongy texture that resembles the outward-facing surface of an umbilical cord, thus resulting in a tactile sensory device having an outer surface texture that feels familiar to the baby or child.

The housing may be made out of any material, non-limiting examples of which are set out as follows and elsewhere in this specification.

In a first example, the housing may be made out of at least one of silicone;

rubber;

polypropylene;

a thermoplastic polymer.

Making the housing out of any of the above materials not only provides a surface that is soft and gentle to the touch and thereby is suitable for use by a baby or child, but also provides a housing with sufficient rigidity to readily reproduce the mechanical vibration when mechanically coupled to the pulsation actuator. In addition any of the above materials, particularly silicone, may be configured to provide an outward-facing surface of the housing with a gelatinous or spongy texture that resembles the outward-facing surface of an umbilical cord.

In a second example, the housing may be made out of at least one of a sterile material;

a sterilisable material;

an antibacterial material;

an antimicrobial material;

a dishwasher-safe material;

a microwave-safe material.

Making the housing out of a sterile material, preferably a medically sterile material, results in a tactile sensory device that is safer for use by the baby or child, particularly new-born babies. Making the housing out of a sterilisable material allows the housing to be sterilised using a sterilising cleaner, such as a sterilising liquid (e.g. Milton® sterilising fluid). For example, the housing may be sterilised by submerging the housing in a sterilising liquid. Making the housing out of an antibacterial material and/or an antimicrobial material allows the housing to have antibacterial and/or antimicrobial properties so that the tactile sensory device is safer for use by the baby or child. Making the housing out of a dishwasher-safe material and/or a microwave-safe material allows the tactile sensory device to be cleaned and/or sterilised prior to being used by the baby or child.

In still further embodiments of the invention, the housing may be formed as a moulded article. Moulding the housing provides a cost-effective way of manufacturing the tactile sensory device because the moulding process can be used to produce a housing for encapsulating internal components of the tactile sensory device.

Optionally an outward-facing surface of the housing may be coloured in:

monochrome;

black and white; or grayscale.

Since a baby or child may have limited visual capability at an early age, the colour(s) of the outward-facing shape may be selected to provide the baby or child with a visual stimulus to develop the crucial first stages of hand and eye coordination. In particular, black and white colours have been found to be particularly useful in training the baby's or child's concentration.

The tactile sensory device of the invention may take any form or shape as long as it is usable by a baby or child and enables the pulsation actuator to produce the mechanical vibration having a pulsatile waveform that is the same, or substantially the same as, a pulsatile waveform of blood flowing in an umbilical cord.

In a preferred embodiment of the invention, the housing may be shaped as a partially or wholly annular housing. The partially or wholly annular shape of the housing enables the baby or child to easily hold or grip the tactile sensory device without letting it go, which is particularly useful due to the typically low grip strength of a baby or child.

It will be understood that a partially annular object has a body with an open cross-section, that is to say the body of the partially annular object surrounds only part of the circumference of an aperture, while a wholly annular object has a body with a closed cross-section, that is to say the body of the wholly annular object surrounds the entire circumference of an aperture.

The tactile sensory device may be configured as a wearable device that is wearable by the baby or child. This not only ensures that the tactile sensory device can be accurately placed on a desired location on the baby's or child's body but also stays on the baby's or child's body regardless of movement.

The tactile sensory device may be configured as a holdable or grippable device that is holdable or grippable by the baby or child. This allows the baby or child to hold or grip the tactile sensory device in the same way a fetus inside the womb holds or grips the umbilical cord.

Preferably the holdable or grippable device is shaped as a ring. The ring shape of the holdable or grippable device enables the baby or child to easily hold or grip the tactile sensory device without it slipping from their hand, which is particularly useful due to the typically low grip strength of a baby or child.

The tactile sensory device may be configured as an oral device that is placeable inside or against the baby's or child's mouth. This may include placing the oral device inside the baby's or child's mouth or pressing the oral device against the baby's or child's lips. This allows the baby or child to easily hold the tactile sensory device in their mouth and/or near or against their lips in the same way a fetus inside the womb sucks on part of the umbilical cord and/or holds the umbilical cord near or against their lips.

Non-limiting examples of the oral device include, but are not limited to, a pacifier, a dummy, a binky and a teether. The oral device may optionally include a handle.

Preferably the oral device includes a mouthpiece. This provides a reliable means for placing the oral device inside or against the baby's or child's mouth. A non-limiting example of a mouthpiece is a teat that is preferably shaped to resemble a human nipple.

In a preferred embodiment of the invention, the mouthpiece may be arranged on a first side of the oral device and the tactile sensory device may further include a switch for turning the pulsation actuator on and off, the switch being arranged to be operable from a second opposite side of the oral device. This arrangement of the mouthpiece and switch not only permits the pulsation actuator to be turned off without disturbing the baby or child when the oral device is placed inside or against the baby's or child's mouth, but also avoids unnecessary contact with the mouthpiece that could contaminate the mouthpiece.

The switch may be arranged on the second side of the oral device so that it can be directly accessed or contacted from the exterior of the oral device. For example, the switch may be arranged so that it can be operated through direct application of a mechanical force to the switch.

Alternatively the switch may be contained inside a housing of the oral device so that it can be indirectly accessed or contacted from the second side and exterior of the oral device. For example, the switch may be arranged inside the housing so that applying a mechanical force onto the second side of the device transmits the mechanical force to the switch contained inside the housing in order to operate the switch.

The tactile sensory device may be configured in various forms for use in a wide range of applications. In non-limiting examples, the tactile sensory device may be or may form part of:

- a garment, e.g. an armband, a wristband, a waistband, a shirt, a belt;
- a fabric, e.g. a towel, a patch, a blanket, a wrap, a sling;
- a piece of furniture, e.g. a seat, a bed, a cot, a mat, a cushion, a pillow;
- an accessory, e.g. a ring to be worn on a finger, a bracelet, a necklace; or
- a toy, e.g. a plush or soft toy.

In use, the tactile sensory device of the invention may be connected to an external power source. For example, the power source may be connected to the external power source via a wired connector. The wired connector may be permanently connected to the power source, or may be detachably connected to the power source via a plug and socket connection.

Alternatively, the tactile sensory device may include a power source for supplying power to the pulsation actuator. The inclusion of a power source in the tactile sensory device removes the need for a wired connector which is potentially harmful to the baby or child not only due to wire entanglement but also exposure to mains electricity. This also allows the tactile sensory device to be portable.

A non-limiting example of the power source is a battery, such as a lithium battery. The shape of the battery may be independent of the tactile sensory device or may follow the shape of the tactile sensory device. In one example, if the shape of the tactile sensory device is curved, the shape of the battery may also be curved. In another example, if the shape of the tactile sensory device is round, the shape of the battery may also be round.

In embodiments of the invention, the power source may be removable. This allows the power source to be replaced if it runs out of charge or is damaged.

In further embodiments, the power source may be rechargeable. This allows the power source to be recharged without having to be removed from the tactile sensory device.

In such embodiments, the tactile sensory device may include a wireless coupler for electrically coupling the power source with an external wireless charger. For example, the tactile sensory device may include an induction coupler for electrically coupling the power source with an external induction charger.

Using wireless charging to charge the power source not only minimises the amount of handling of the tactile sensory device and thereby improves the cleanliness of the tactile sensory device, but also removes the risk of exposed electrical components (e.g. circuitry or wiring) that could harm the baby or child.

According to a second aspect of the invention, there is provided a method of manufacturing a tactile sensory device for use by a baby or child, the method comprising the steps of providing a pulsation actuator and configuring the pulsation actuator to produce a mechanical vibration having a pulsatile waveform that is the same, or substantially the same as, a pulsatile waveform of blood flowing in an umbilical cord.

The features and advantages of the tactile sensory device of the first aspect of the invention and its embodiments apply mutatis mutandis to the method of the second aspect of the invention and its embodiments.

In the method of the invention, the pulsatile waveform of blood flowing in an umbilical cord may be a sawtooth, or substantially sawtooth, waveform.

The method of the invention may include the step of generating an electrical signal to control the pulsation actuator to produce the mechanical vibration. The method of the invention may further include the step of providing a controller to generate the electrical signal.

The method of the invention may include the step of providing an electrical waveform signal to drive the pulsation actuator to produce the mechanical vibration. The method of the invention may include the step of providing a controller including a waveform generator to provide the electrical waveform signal.

In the method of the invention, the controller may be a programmable or hardwired controller.

The method of the invention may include the step of providing the pulsation actuator with a motor for producing the mechanical vibration.

The method of the invention may include the step of providing the tactile sensory actuator with a housing mechanically coupled to the pulsation actuator, wherein the pulsation actuator may be contained inside the housing or may be integral to the housing.

The method of the invention may include the step of making the housing out of least one of:

silicone;

rubber;

polypropylene;

a thermoplastic polymer.

The method of the invention may include the step of making the housing out of least one of:

a sterile material;

a sterilisable material;

an antibacterial material;

an antimicrobial material;

a dishwasher-safe material;

a microwave-safe material.

The method of the invention may include the step of forming the housing as a moulded article.

The method of the invention may include the step of shaping an outward-facing surface of the housing to be the same, or substantially the same, as an outward-facing surface of an umbilical cord.

The method of the invention may include the step of texturing an outward-facing surface of the housing to be the same, or substantially the same, as an outward-facing surface of an umbilical cord.

The method of the invention may include the step of colouring an outward-facing surface of the housing in:

monochrome;

black and white; or grayscale.

The method of the invention may include the step of shaping the housing as a partially or wholly annular housing.

The method of the invention may include the step of configuring the tactile sensory device as a wearable device that is wearable by the baby or child.

The method of the invention may include the step of configuring the tactile sensory device as a holdable or grippable device that is holdable or grippable by the baby or child.

The method of the invention may include the step of shaping the holdable or grippable device as a ring.

The method of the invention may include the step of configuring the tactile sensory device as an oral device that is placeable inside or against the baby's or child's mouth.

The method of the invention may include the step of providing the oral device with a mouthpiece.

The method of the invention may include the step of arranging the mouthpiece on a first side of the oral device, and the step of providing the tactile sensory device with a switch for turning the pulsation actuator on and off, the switch being arranged to be operable from a second opposite side of the oral device.

The method of the invention may include the step of forming the tactile sensory device as, or a part of:

a garment;

a fabric;

a piece of furniture;

an accessory; or a toy.

The method of the invention may include the step of providing the tactile sensory device with a power source for supplying power to the pulsation actuator.

The method of the invention may include the step of providing the tactile sensory device with a removable and/or rechargeable power source.

The method of the invention may include the step of providing the tactile sensory device with a wireless coupler for coupling the power source with a wireless charger.

It will be appreciated that the use of the terms "first" and "second", and the like, in this patent specification is merely intended to help distinguish between similar features (e.g. the first and second sides of the oral device), and is not intended to indicate the relative importance of one feature over another feature, unless otherwise specified.

Preferred embodiments of the invention will now be described, by way of non-limiting embodiments, with reference to the accompanying drawings in which.

The figures are not necessarily to scale, and certain features and certain views of the figures may be shown exaggerated in scale or in schematic form in the interests of clarity and conciseness.

The following embodiments of the invention are described with reference to a tactile sensory grippable ring and a tactile sensory pacifier for use by a baby or child, but it will be appreciated that the following embodiments of the invention are applicable mutatis mutandis to other types of tactile sensory devices for use by a baby or child.

For ease of description, the following embodiments of the invention will be described with reference to their use by a new-born baby, but it would be understood that the following embodiments of the invention may be used by a toddler, infant or older child.

Figure 1:
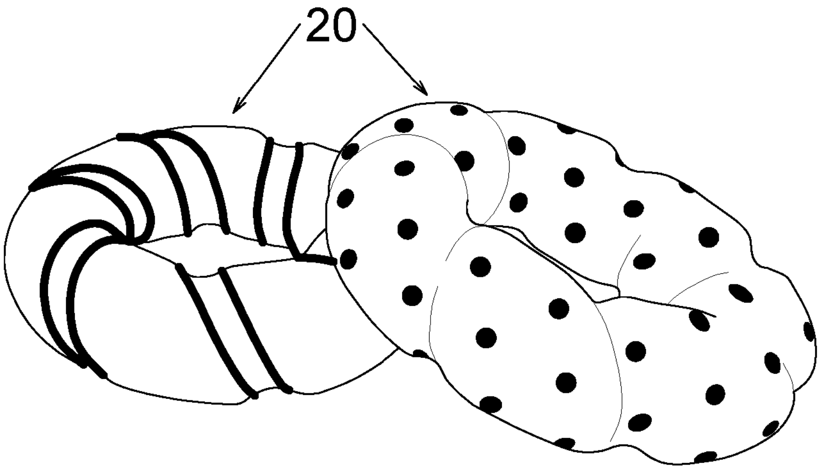
FIGS. 1 and 2 show a tactile sensory device according to a first embodiment of the invention.
Figure 2:
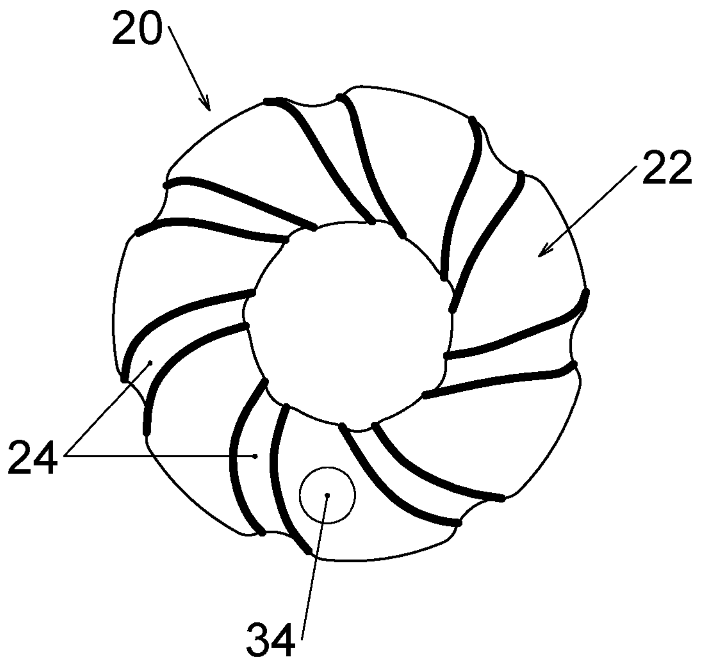

A tactile sensory device according to a first embodiment of the invention is shown in FIGS. 1 and 2 and is designated generally by the reference numeral 20.

The tactile sensory device 20 comprises a housing 22, a pulsation actuator, a controller and a power source.

The housing 22 is shaped as a ring that is grippable by a baby's hand. An outward-facing surface of the housing 22 includes a series of grooves 24 that are spaced apart about a circumference of the ring-shaped housing 22. Each groove is inclined relative to the circumferential axis of the housing 22.

The housing 22 is made out of silicone using a moulding process, e.g. an injection moulding process. Constructing the housing 22 out of silicone results in a housing 22 that is not only made out of a sterile material but also can be cleaned in a dishwasher and/or sterilised in a microwave prior to being used by the baby. Constructing the housing 22 out of silicone also allows the housing 22 to be sterilised using a sterilising cleaner, such submerging the housing 22 in a sterilising liquid (e.g. Milton® sterilising fluid). Constructing the housing 22 out of silicone allows the housing 22 to be configured to have antibacterial and/or antimicrobial properties. Constructing the housing 22 out of silicone also results in the outward-facing surface of the housing 22 having a gelatinous or spongy texture that resembles the outward-facing surface of an umbilical cord.

It is envisaged that, in other embodiments of the invention, the housing 22 may be made out of any other material such as rubber, polypropylene or a thermoplastic polymer.

The outward-facing surface of the housing 22 is coloured in black and white but in other embodiments may have a different colour scheme such as monochrome and grayscale. In the embodiment shown in FIG. 1, the outward-facing surface may be coloured to either include black stripes on a white background where the black stripes are arranged along the edges of the grooves, or include black spots on a white background. This may be used to provide the baby with a visual stimulus to aid their development, particularly in relation to hand and eye coordination and concentration. Other patterns may be applied to the outward-facing surface of the housing 22.

Figure 3:
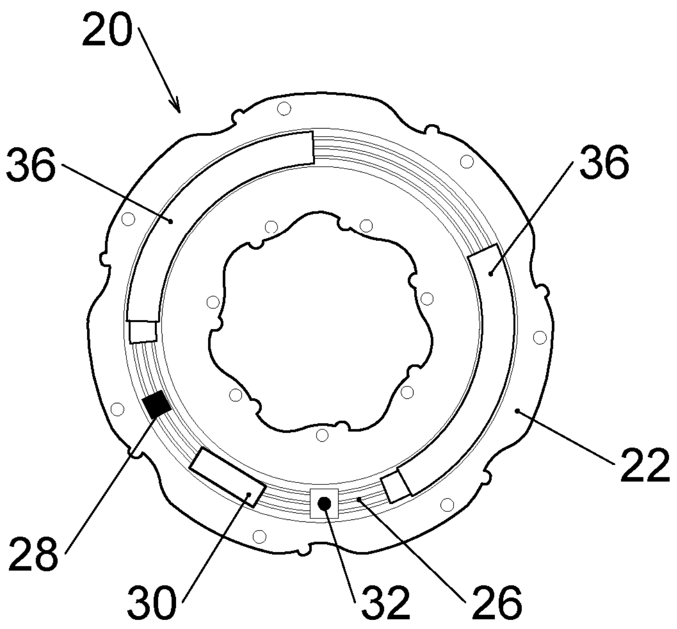
FIG. 3 shows internal components of the tactile sensory device of FIG. 2.

FIG. 3 shows internal components of the tactile sensory device 20.

The pulsation actuator includes a printed circuit board (PCB) 26 and a haptic motor 28 for producing a mechanical vibration. The motor 28 is mounted onto the PCB 26. The housing 22 comprises first and second housing portions that when assembled define a tubular housing 22 with an annular internal housing cavity. The PCB 26 is shaped as a ring and is dimensioned to fit inside the internal housing cavity.

When the rigid PCB 26 is contained inside the internal housing cavity, the PCB 26 and housing 22 are placed in direct physical contact so that they are mechanically coupled together. As a result, any mechanical vibration produced by the motor 28 causes the PCB 26 and therefore the housing 22 to also produce a mechanical vibration with identical or substantially identical characteristics.

The controller is mounted onto the PCB 26. The controller includes a microcontroller 30 that is capable of generating digital electrical waveform signals. The controller further includes a digital-to-analogue converter (DAC) that operably connects the microcontroller 30 to the motor 28. In use, the DAC receives an input digital electrical waveform signal from the microcontroller 30 and produces an output analogue electrical waveform signal that drives the motor 28 to produce a mechanical vibration.

A switch in the form of a push button 32 is mounted onto the PCB 26. In use, the push button 32 can be operated by squeezing a part of the silicone housing 22 that encapsulates the push button 32. Preferably the push button 32 and silicone housing 22 are configured to provide a measure of physical resistance to prevent the baby from accidentally operating the push button 32. For example, the push button 32 may include a spring that provides a biasing force that cannot be overcome by a mechanical force applied by a baby but can be readily overcome by a mechanical force applied by an adult, or the silicon housing may be configured to be rigid enough to resist a mechanical force applied by a baby but not rigid enough to resist a mechanical force applied by an adult. The location of the push button 32 inside the silicone housing 22 may be marked by adding a visual indicator 34 to the outward-facing surface of the housing 22 for easy identification. The operation of the button 32 may be used to selectively turn the pulsation actuator on and off.

The power source includes a rechargeable battery 36 for supplying power to the controller and motor 28. In the embodiment shown, the battery 36 is in the form of a pair of lithium-ion polymer batteries. The battery 36 is curved to follow the curved shape of the tactile sensory device 20. Other types of batteries may be used in place of the lithium-ion polymer batteries.

Figure 4:
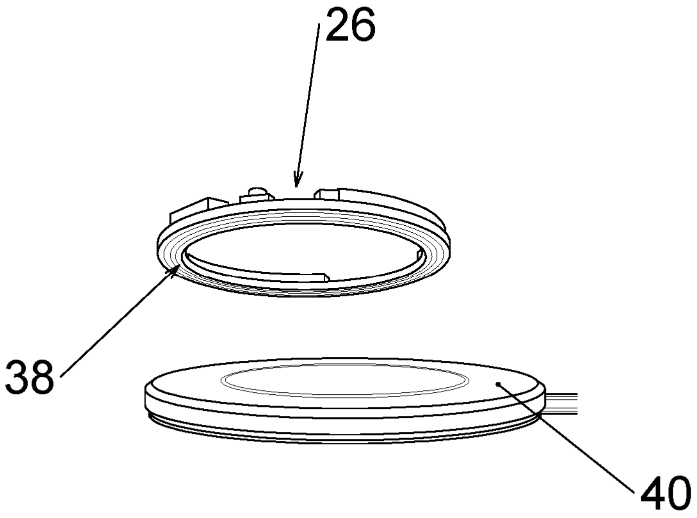
FIGS. 4 and 5 show an induction charging feature of the tactile sensory device of FIG. 2.
Figure 5:
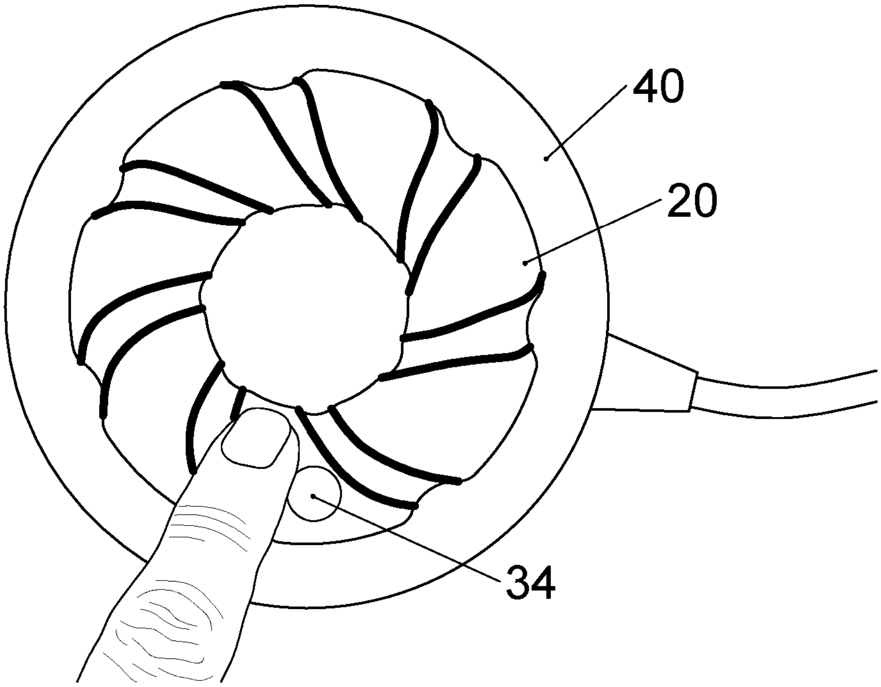

FIGS. 4 and 5 show an induction charging feature of the tactile sensory device 20. FIG. 5 also shows a user's finger just before it presses the visual indicator 34 on the outward-facing surface of the housing 22 which identifies the location of the push button 32.

The tactile sensory device 20 further includes an induction coil 38 that is configured to be electrically connected to the battery 36. The induction coil is mounted on the side of the PCB 26 that is opposite to the side of the PCB 26 that has the motor 28, microcontroller 30, push button 32 and battery 36. To charge the battery 36, the tactile sensory device 20 is placed on a pad of an induction charger 40 so that the induction coil 38 is electrically coupled with the induction charger 40 and thereby enables the induction charger 40 to supply electrical power to the battery 36. The induction charging process removes any potential interaction with exposed metal components and also avoids build-up of dirt and grime on the surface of the housing 22 caused by regular handling.

The configuration of the tactile sensory device 20 of FIGS. 1 and 2 therefore results in a baby-friendly grippable ring 20 with an outer shape and an outer texture that feels familiar to the baby. In addition, the encapsulation of the internal components inside the housing 22 not only protects the internal components from damage but also prevents the baby from freely accessing the internal components that could lead to harm to the baby.

The microcontroller 30 is programmed to control the motor 28 to produce a mechanical vibration that mimics the pulsation of the blood flow through the umbilical cord. In particular, the motor 28 is controlled to produce a mechanical vibration having a pulsatile waveform that is the same, or substantially the same as, a pulsatile waveform of blood flowing in an umbilical cord.

An umbilical cord of a full-term new-born baby is about 50 cm to about 70 cm long and about 2 cm in diameter.

The pulsatile waveform of blood flowing in an umbilical cord may be exemplarily measured and recorded using spectral Doppler velocimetry. The measurement is carried out during the pregnancy phase, and may preferably be carried out at different gestational ages throughout the pregnancy. This is because umbilical blood flow increases as the pregnancy progresses. Typical flow rates for blood flow through the umbilical cord is approximately 35 mL/min at 20 weeks of gestation, and 240 mL/min at 40 weeks of gestation. [Ref: Kiserud T, Acharya G (2004), "The fetal circulation", Prenatal Diagnosis. 24 (13): 1049-59. doi: 10.1002/pd.1062. PMID 15614842].

Figure 6:
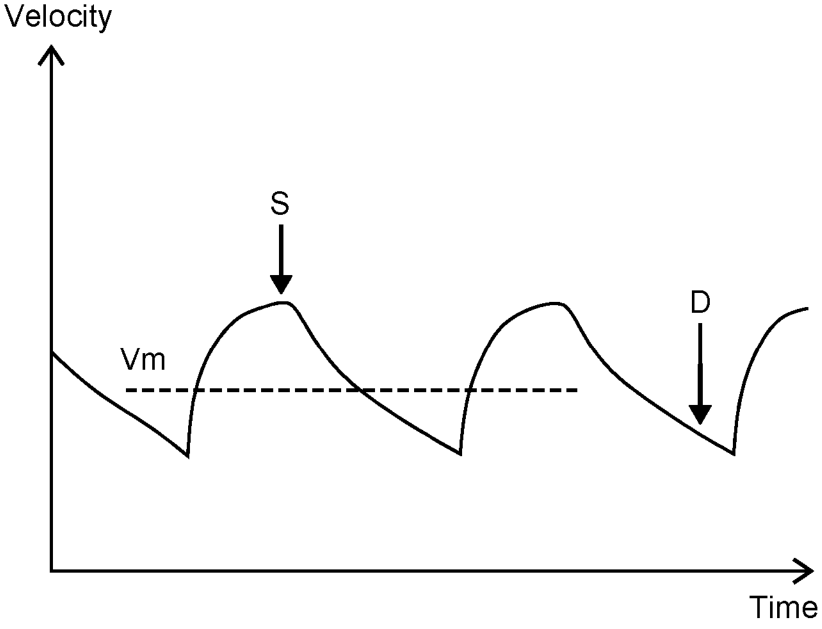
FIG. 6 shows an exemplary pulsatile waveform of blood flowing in an umbilical cord.

FIG. 6 shows an exemplary pulsatile waveform of blood flowing in an umbilical cord.

The pulsatile waveform of blood flowing in an umbilical cord corresponds to the variation of arterial blood flow velocity in the umbilical cord with time which typically has a sawtooth waveform shape. The variation in arterial blood flow velocity in an umbilical cord with time can be characterised by the following umbilical artery Doppler indices:

the umbilical arterial systolic to diastolic ratio; the resistance index; and the pulsatility index. These indices gradually decline with gestational age due to an increase in diastolic flow with fetus maturity.

The umbilical arterial systolic to diastolic ratio is equal to S/D, the resistance index is equal to (S−D)/S, and the pulsatility index is equal to (S−D)/Vm, where S=peak systolic velocity which is the maximum velocity during contraction of the fetal heart; D=end diastolic velocity which is the velocity of continuing forward flow in the umbilical artery during the relaxation phase of the heartbeat; and Vm=mean velocity of the arterial blood flow.

Exemplary reference ranges for the umbilical artery Doppler indices across a range of gestational ages for different percentiles are disclosed in Acharya G, Wilsgaard T, Berntsen G K, Maltau J M, Kiserud T, "Reference ranges for serial measurements of umbilical artery Doppler indices in the second half of pregnancy", Am J Obstet Gynecol. 2005 March, 192(3):937-44.

The configuration of the tactile sensory device 20 of FIGS. 1 and 2 as a grippable ring 20 allows the baby to easily hold the tactile sensory device 20 in their hand in the same way a fetus inside the womb holds the umbilical cord in their hand. This in turn allows the baby to seek comfort through the mechanical vibration of the grippable ring 20, where the mechanical vibration is configured to have a pulsatile waveform that mimics the pulsation of blood flowing in the umbilical cord as detailed above.

By configuring the tactile sensory device 20 to mimic the pulsation of blood flowing in the umbilical cord, a familiar sensation is recreated for the baby that is comforting, soothing and stress-relieving. The tactile sensory device 20 may be provided to the baby shortly after birth or at a later time.

Figure 7:
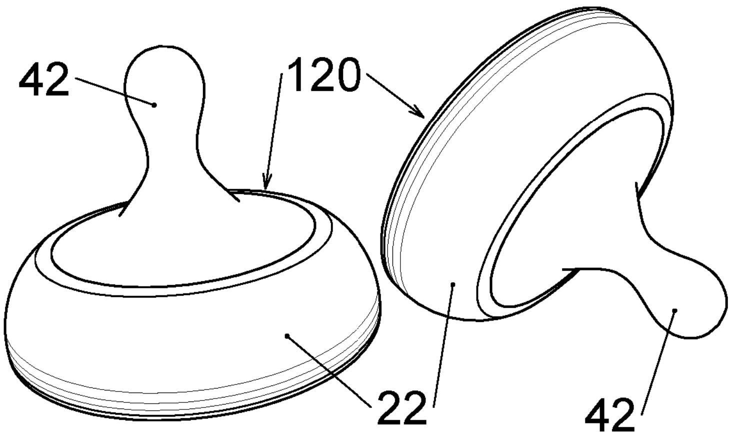
FIG. 7 shows a tactile sensory device according to a second embodiment of the invention.
Figure 8:
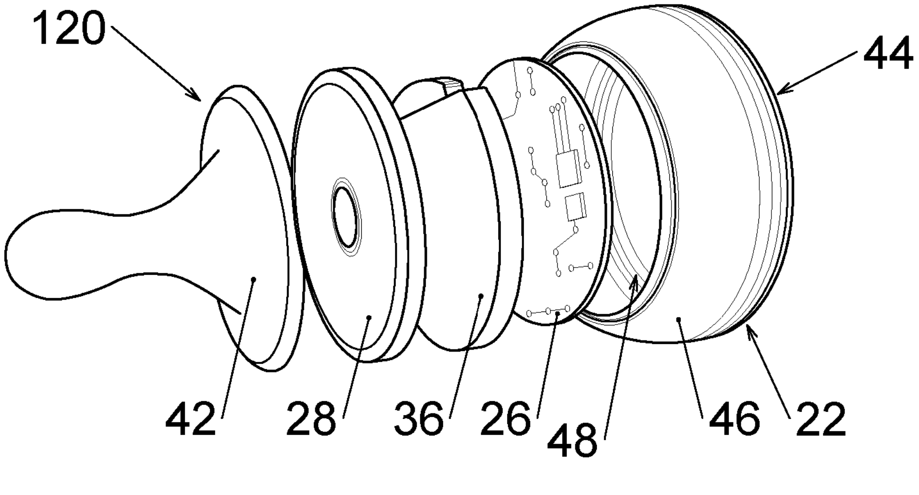
FIGS. 8 and 9 show internal components of the tactile sensory device of FIG. 7.

A tactile sensory device according to a second embodiment of the invention is shown in FIGS. 7 and 8 and is designated generally by the reference numeral 120. The tactile sensory device 120 of FIGS. 7 and 8 is similar in structure and operation to the tactile sensory device 20 of FIGS. 1 and 2 and like features share the same reference numerals.

The tactile sensory device 120 of FIGS. 7 and 8 differs from the tactile sensory device 20 of FIGS. 1 and 2 in that the tactile sensory device 120 of FIGS. 7 and 8 is configured as a pacifier 120 that is to be placed inside the baby's mouth. In particular, the pacifier 120 includes a teat 42 that is placed inside the baby's mouth in order to help locate the pacifier 120 against the baby's lips.

The housing 22 of the pacifier 120 comprises a base 44 and a sidewall 46. The sidewall 46 projects from the base 44 and extends about the circumference of the base 42 to define a receptacle 48. In the embodiment shown in FIGS. 7 and 8, the receptacle resembles a cup or bowl.

Figure 9:
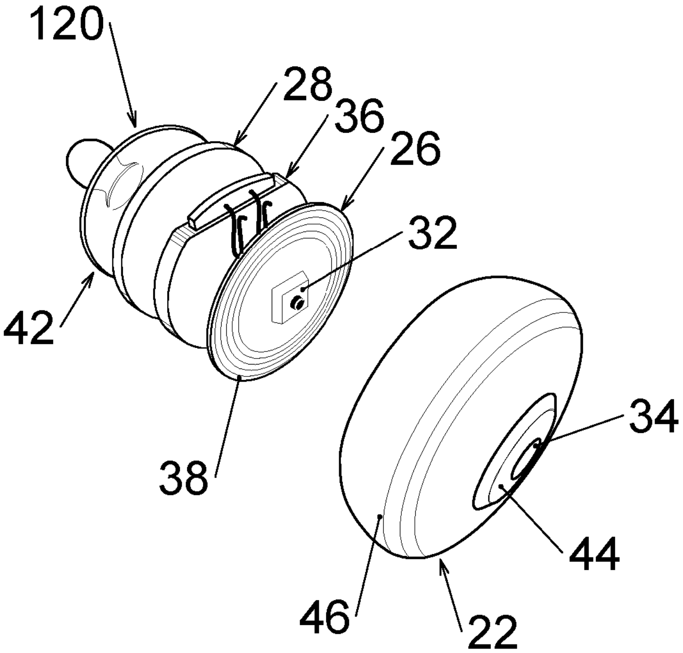

FIGS. 8 and 9 show internal components of the tactile sensory device 120.

Each of the motor 28, battery 36 and PCB 26 is shaped as a disc that has an outer diameter that corresponds to the inner diameter of the receptacle 48 of the housing 22. The PCB 26 is first fitted inside the receptacle 48, the battery 36 is placed on top of a first side of the PCB 26, and the motor 28 is placed on top of the battery 36. The teat 42 is placed on top of the battery 36 to encapsulate the PCB 26, battery 36 and motor 28 between the teat 42 and housing 22.

A switch in the form of a push button 32 is mounted on a second, opposite side of the PCB 26 so that applying a mechanical force onto the base 44 of the housing 22 transmits the mechanical force to the push button 32 contained inside the housing 22 in order to operate the switch. The operation of the button 32 may be used to selectively turn the pulsation actuator on and off. The location of the push button 32 inside the silicone housing 22 may be marked by adding a visual indicator 34 to an outward-facing surface of the base 44 of the housing 22 for easy identification.

Figure 10:
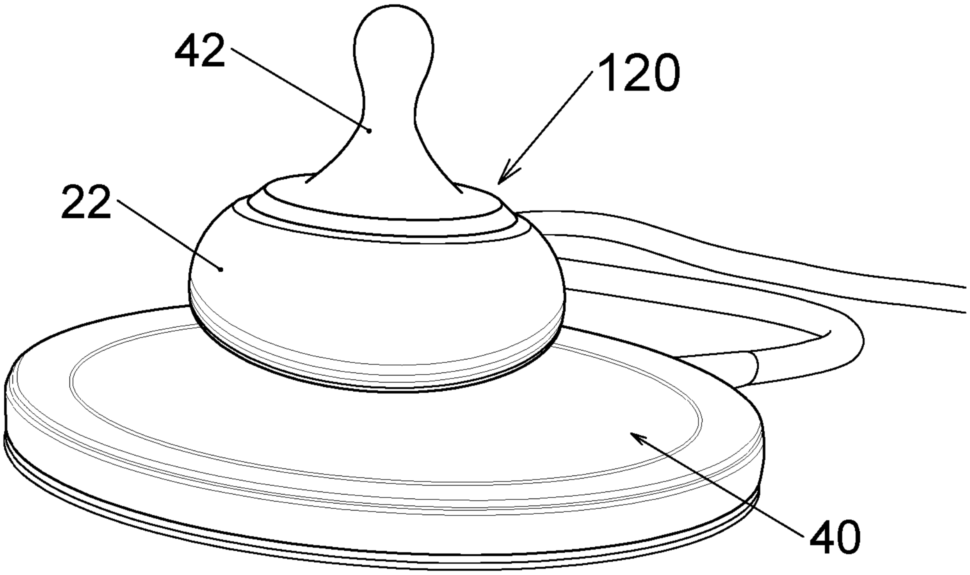
FIG. 10 shows an induction charging feature of the tactile sensory device of FIG. 7.

FIG. 10 shows an induction charging feature of the tactile sensory device 120.

Similarly to the tactile sensory device 20 as shown in FIGS. 4 and 5, the tactile sensory device 120 further includes an induction coil 38 on the same side of the PCB 26 as the push button 32. To charge the battery 36, the tactile sensory device 120 is placed on a pad of an induction charger 40 so that the induction coil 38 is electrically coupled with the induction charger 40 and thereby enables the induction charger 40 to supply electrical power to the battery 36.

The configuration of the tactile sensory device 210 of FIGS. 7 and 8 therefore results in a pacifier 120 that can be easily used by a baby. In addition, the encapsulation of the internal components between the teat 42 and housing 22 not only protects the internal components from damage but also prevents the baby from freely accessing the internal components that could lead to harm to the baby.

The configuration of the tactile sensory device 120 of FIGS. 7 and 8 as a pacifier 120 allows the baby to easily hold the tactile sensory device 120 against their lips and in their mouth in the same way a fetus inside the womb holds the umbilical cord against their lips and/or sucks on part of the umbilical cord. This in turn allows the baby to seek comfort through the mechanical vibration of the pacifier 120 against their lips and in their mouth, where the mechanical vibration is configured to have a pulsatile waveform that mimics the pulsation of blood flowing in the umbilical cord. Details of the pulsatile waveform of blood flowing in the umbilical cord is the same as described above with reference to the tactile sensory device 20 of FIGS. 1 and 2.

Examples of other optional and alternative features of the above embodiments are described as follows.

Optionally the microcontroller may be a programmable controller. Configuring the microcontroller as a programmable controller allows the tactile sensory device to produce a range of mechanical vibrations through reprogramming of the controller. For example, the controller may be programmed to:

- use a pulsatile waveform chosen from a selection of pulsatile waveforms of blood flowing in an umbilical cord at different gestational ages;
- control the pulsation actuator to stop the mechanical vibration after a specific time period has lapsed;
- control the pulsation actuator to periodically produce the mechanical vibration at regular intervals of time.

It will be appreciated that the tactile sensory device of the invention may be alternatively configured to be or form part of another type of oral device, a garment, a fabric, a piece of furniture, an accessory or a toy, non-limiting examples of which are described throughout the specification. Also, configuring the tactile sensory device as a wearable device that is wearable by the baby not only ensures that the tactile sensory device can be accurately placed on a desired location on the baby's body but also stays on the baby's body regardless of movement.

Optionally the battery may be configured to be removable from the tactile sensory device.

Further optionally the tactile sensory device may omit the power source and may be configured to be connectable to an external power source.

It is envisaged that, in other embodiments of the invention, the controller may be a hardwired controller. It is also envisaged that, in still other embodiments of the invention, the tactile sensory device may be configured to work with an external controller.

It is envisaged that, in other embodiments of the invention, the PCB may be excluded or may be replaced by other types of electrical connectors and/or support structures.

It will be appreciated that the numerical values given for the embodiments shown are merely chosen to help illustrate the working of the invention and may be replaced by other numerical values.

Preferences and options for a given aspect, feature or parameter of the invention should, unless the context indicates otherwise, be regarded as having been disclosed in combination with any and all preferences and options for all other aspects, features and parameters of the invention.

The listing or discussion of an apparently prior published document in this specification should not necessarily be taken as an acknowledgement that the document is part of the state of the art or is common general knowledge.

The invention claimed is:

1. A tactile sensory device for use by a baby or child, the tactile sensory device comprising a pulsation actuator configured to produce a mechanical vibration having a pulsatile waveform that is the same as a recorded pulsatile waveform of blood flowing in an umbilical cord having a waveform shape that corresponds to the variation of umbilical cord blood flow velocity with time.

2. The tactile sensory device according to claim 1 wherein the pulsatile waveform of blood flowing in an umbilical cord is a sawtooth, or substantially sawtooth, waveform.

3. The tactile sensory device according to claim 1 including a controller configured to, in use, generate an electrical signal to control the pulsation actuator to produce the mechanical vibration.

4. The tactile sensory device according to claim 3 wherein the controller includes a waveform generator configured to, in use, provide an electrical waveform signal to drive the pulsation actuator to produce the mechanical vibration.

5. The tactile sensory device according to claim 1 wherein the pulsation actuator includes a motor for producing the mechanical vibration.

6. The tactile sensory device according to claim 1 including a housing mechanically coupled to the pulsation actuator, wherein the pulsation actuator is contained inside the housing or is integral to the housing.

7. The tactile sensory device according to claim 6 wherein an outward-facing surface of the housing is shaped to be the same, or substantially the same, as an outward-facing surface of an umbilical cord.

8. The tactile sensory device according to claim 6 wherein an outward-facing surface of the housing is textured to be the same, or substantially the same, as an outward-facing surface of an umbilical cord.

9. The tactile sensory device according to claim 6 wherein the housing is made out:

silicone;
rubber;
polypropylene;
a thermoplastic polymer;
a sterile material;
a sterilisable material;
an antibacterial material;
an antimicrobial material;
a dishwasher-safe material; and/or
a microwave-safe material.

10. The tactile sensory device according to claim 6 wherein the housing is formed as a molded article.

11. The tactile sensory device according to claim 6 wherein an outward-facing surface of the housing is colored in:

monochrome;
black and white; or
grayscale.

12. The tactile sensory device according to claim 6 wherein the housing is shaped as a partially or wholly annular housing.

13. The tactile sensory device according to claim 1 wherein the tactile sensory device is configured as a wearable device that is wearable by the baby or child.

14. The tactile sensory device according to claim 1 wherein the tactile sensory device is configured as a holdable or grippable device that is holdable or grippable by the baby or child.

15. The tactile sensory device according to claim 1 wherein the tactile sensory device is configured as an oral device that is placeable inside or against the baby's or child's mouth.

16. A tactile sensory device according to claim 15 wherein the oral device includes a mouthpiece, wherein the mouthpiece is arranged on a first side of the oral device and wherein the tactile sensory device further includes a switch for turning the pulsation actuator on and off, the switch being arranged to be operable from a second opposite side of the oral device.

17. A tactile sensory device according to claim 1 wherein the tactile sensory device is or forms part of:

a garment;
a fabric;
a piece of furniture;
an accessory; or
a toy.

18. A tactile sensory device according to claim 1 including a power source for supplying power to the pulsation actuator, wherein the power source is removable and/or wherein the power source is rechargeable.

19. A tactile sensory device according to claim 1 including a power source for supplying power to the pulsation actuator, wherein the tactile sensory device includes a wireless coupler for electrically coupling the power source with an external wireless charger.

* * * * *